May 18, 1965
H. E. HAYNES
3,184,732
COMPUTER CIRCUIT
Filed April 15, 1960
2 Sheets-Sheet 1
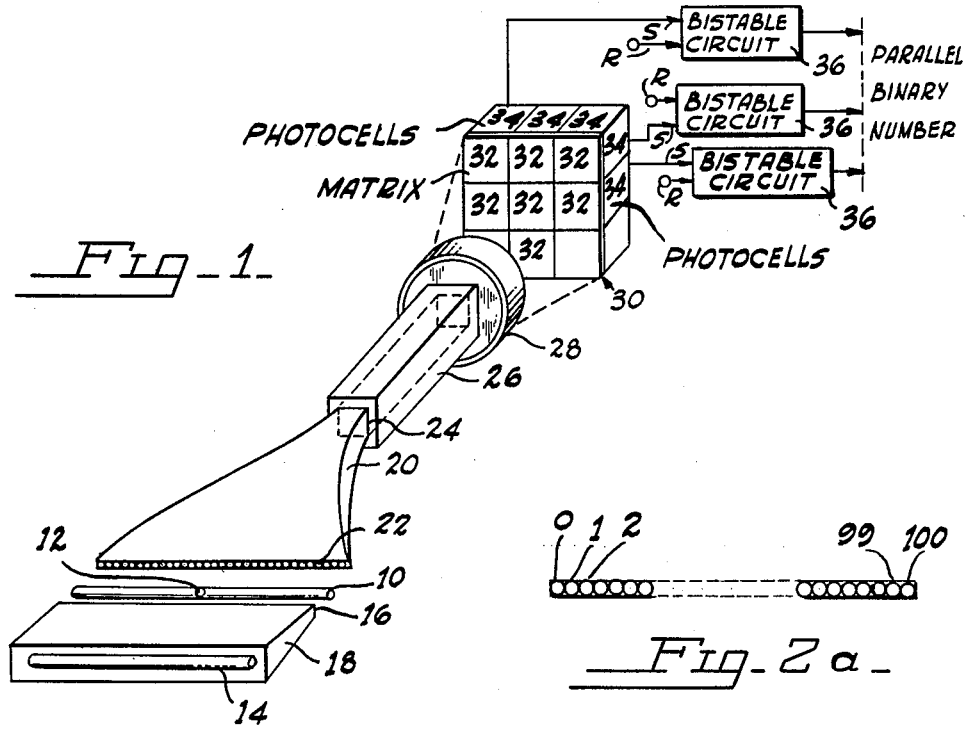
Fig. 1
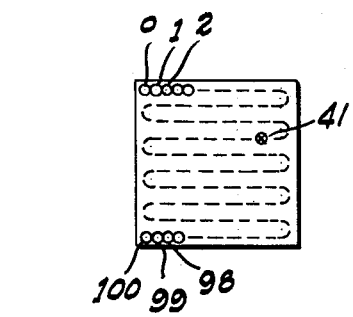
Fig. 2a
Fig. 2b
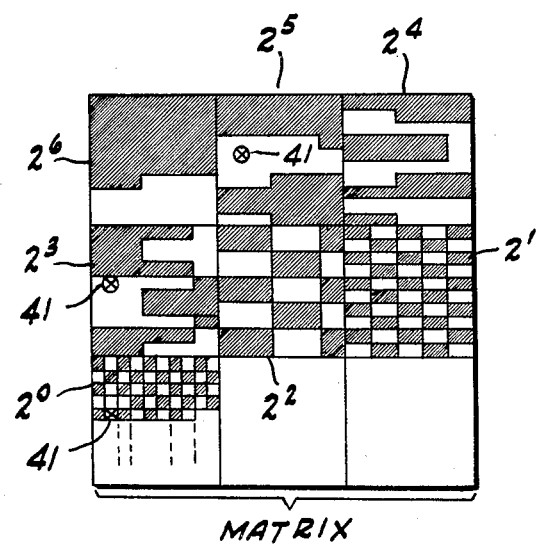
MATRIX
Fig. 3
INVENTOR.
HAROLD E. HAYNES
BY John V. Regan
ATTORNEY INVENTOR.
HAROLD E. HAYNES
BY John V. Regan
ATTORNEY 3,184,732
COMPUTER CIRCUIT
Harold E. Haynes, Haddonfield, N.J., assignor to Radio Corporation of America, a corporation of Delaware
Filed Apr. 15, 1960, Ser. No. 22,632
8 Claims. (Cl. 340—347)

This invention relates to a new and improved system for converting optical positional information into digital information. The optical information may be in the form of a luminous mark on the screen of a cathode ray tube, the position of a bubble in a tube of a liquid such as mercury, or the coordinates of a graph or other suitable form.

The system of the invention includes a matrix having a plurality of cells, each representing a different digit in a binary system of notation. The cells are optically actuated in accordance with the magnitude of the analog quantity to produce outputs in a binary system of notation indicative of this magnitude.

The invention will be described in greater detail by reference to the following description taken in connection with the accompanying drawing in which:

FIG. 1 is a schematic perspective view of one form of system according to the present invention;

FIGS. 2a and 2b are views of opposite ends of the fiber optics shown in FIG. 1;

FIG. 3 is an enlarged view of the cells in the matrix of FIG. 1;

Similar reference numerals are applied to similar elements throughout the figures.

Figure 4:
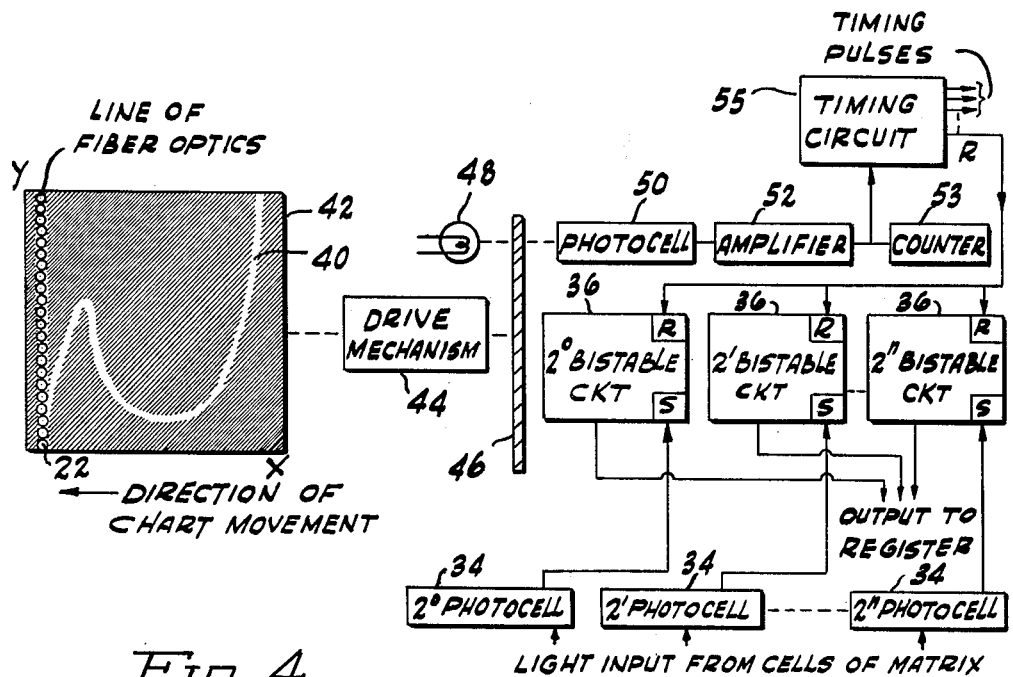
FIG. 4 is a block and schematic diagram of another form of the present invention.

FIG. 1 shows the use of the present invention in a system in which it is desired to represent digitally the position of an air bubble in a straight capillary tube filled with mercury. The position of the bubble of air may, for example, represent the acceleration of a vehicle on which the system of this invention is mounted. For the purposes of the present discussion, it may be assumed that it is desired to read the bubble position to an accuracy of one part in a hundred. Actually, the accuracy obtained may be much greater than this as is explained in more detail later.

The column of mercury discussed above is shown at 10 and the air bubble is at 12. The column of mercury is illuminated by an elongated source of light 14 which is collimated to a line source at 16 by the collimator 18. In practice, the line source 16 is immediately adjacent to the tube 10 and the light shielding is such that light is blocked by the mercury and passes only through the bubble 12. Further, an opaque mask (not shown) with a slit in it as wide as the bore of the capillary tube may be placed between the tube 10 and the fibers 20. The slit, in this case, is positioned at or near the focal plane of the bore. The slit may be in close actual relation to the bore or may be in a plane in which the tube 10 is imaged by lenses (not shown), such as the plane of the fiber ends.

The light passing through bubble 12 is received by fiber optics 20. The fibers can be made of glass, quartz, nylon, polystyrene or other synthetic materials. Light is constrained in passing through a fiber by a series of total reflections from within the wall of the fiber. Preferably, the fibers are coated with a thin layer of transparent material having an index of refraction lower than that of the core material to reduce light leakage.

The fibers are arranged in a line 22 at the end of the fibers adjacent to the capillary tube 10 and in a square 24 at the opposite end of the fibers. The two ends of the fibers are shown in FIGS. 2a and 2b, respectively. Preferably, the square end of the fibers is arranged in a regular pattern such as the serpentine one shown in FIG. 2b. It is to be understood, however, that this is merely illustrative as the fibers may be arranged in a spiral or, in some applications, even randomly. However, to repeat, in the exemplary embodiments described herein it is preferred that the fibers be in a regular pattern such as shown.

Light emitted from the square end 24 of the fiber optics passes through the optical tunnel 26 and lens 28. The purpose of the optical tunnel and lens is to project the single spot of light appearing at the end 24 of the fiber optics into a multiplicity of light spots. In the application shown, the light is projected onto the same position on each of the nine cells 32 in a matrix 30.

The tunnel itself consists of a plurality of internal reflectors facing one another. The tunnel shown at 26 consists of four internal mirrors and the internal cross-section of the tunnel is square. However, it is possible to use three mirrors and a tunnel of triangular cross-section or more than four mirrors and a tunnel of other regular polygon cross-section. The operation of the tunnel is understood in the art and is explained in detail, for example, in application Serial No. 3,921, filed January 21, 1960, by D. J. Parker, T. I. Ress, and H. J. Woll and assigned to the same as the present invention.

Although nine cells are shown in the 3 x 3 matrix 30, the number of cells actually used will depend upon the precision (i.e., the number of binary digits) to which it is desired to represent the analog quantity. In the present instance, it was stated an accuracy of one part in a hundred is desired. Therefore, only seven of the nine cells are needed, since seven binary bits can represent 128 numbers. The output of each cell 32 which is used in the matrix is applied to a photocell 34, some of which are shown in FIG. 1. If the light from the optical tunnel and lens is directed on a transparent area of the cell 32, it passes through the cell and actuates the photocell, and if the light is projected onto an opaque area in the cell 32, the photocell 34 is not actuated. The photocell output, when one is present, is applied to the set terminal of a bistable circuit 36, three of which are shown in FIG. 1. The state of each bistable circuit is indicative of one digit of the binary number to be represented.

A more detailed showing of the matrix 30 appears in FIG. 3. Here it is seen that each of the cells is marked off into transparent and opaque areas. The upper left cell represents the most significant binary digit of rank $2^6$ and is so legended; the next cell represents the next most significant binary digit of rank $2^5$, and so on. It may be seen that each of the cells is differently coded.

The operation of the arrangement of FIG. 1 may be better understood by a specific example. Assume that the bubble 12 in capillary tube 10 of FIG. 1 is $41/100$ of the distance from the left end of the tube toward the right end, as viewed in the figure. Light passes through the bubble and is projected onto one or more of the fibers along the line 22 of the fibers. The number of fibers illuminated will depend, of course, on the size of the fibers compared to that of the bubble and the position of the bubble. The light received at the end 22 of the fibers appears at the opposite end 24 of the fibers in position 41 as shown in FIG. 2b. The optical tunnel and lens project this spot of light onto each cell in the same relative position in the cell as it appears at the square end 24 of the fibers. Thus, the spot of light appears over a clear area in cells $2^5$, $2^3$, and $2^0$, as shown by the cross 41 in FIG. 3, and over a dark area in the remaining cells $2^6$, $2^4$, $2^2$, and $2^1$. Electrical outputs accordingly appear only at the photocells 34 immediately adjacent to the $2^5$, $2^3$, and $2^0$ cells. These electrical outputs, which represent the parallel binary number 0101001 or 41, set the bistable circuits 36 to which they are applied. Therefore, the condition of the bistable circuits (whether set or reset) also represents a parallel binary number. The voltage output of the bistable circuits (FIG. 1) may be applied to a register for storage in parallel binary form or may be read out in time sequence in serial binary form. The circuits involved are conventional and need not be discussed here. The bistable circuits may be reset manually or automatically by applying reset voltages to their reset inputs R. Again, the circuits are conventional.

The circuit described is capable of an accuracy of one part in a hundred. In practical circuits, much greater accuracy than this is possible. For example, in one practical application accuracies of one in 10,000 are desired. In this application the matrix includes 5 x 5 or 25 cells to provide a symmetrical cell arrangement. Fourteen of the twenty-five cells, each optically coded to represent a different binary digit of a fourteen digit binary number, are used. In this practical system, the bubble diameter may be of the order of .004 of an inch and the capillary tube length of the order of 10 inches. Fibers having a diameter of 0.001 inch are available and would be suitable. With fibers this small, the linear fiber array (end 22 of the fibers) may have a thickness of 5 or 10 fibers or so.

In applications in which extreme accuracy is not required, the cells of the matrix may be made transparent and opaque in advance by photographic or other techniques. However, in very high accuracy applications, the cell may be calibrated in the following manner. Assume the accuracy desired is 1 part in 10,000 and that the matrix has 25 cells, 14 of which are used. The position of the light bubble 12 is established by high precision laboratory instruments point by point. An unexposed, covered photographic plate or film the size of the matrix is inserted at the matrix position and carefully registered. For each calibrated position of the bubble, portions of the film corresponding to the cells in the matrix it is desired to make opaque are exposed. For example, in the case in which the bubble is $2187/10,000$ of the distance towards the right end of the tube, cells corresponding to ranks $2^{11}$, $2^7$, $2^3$, $2^1$, and $2^0$ (the binary number 100010001011) should pass light and the remaining cells should block light. Therefore, the portions of the photographic plate corresponding to the $2^{14}$, $2^{13}$, $2^{12}$, $2^{10}$, $2^9$, $2^8$, $2^6$, $2^5$, $2^4$, and $2^2$ cells are uncovered and exposed. Other input values (positions of the bubble) are similarly handled. After all desired input values have been calibrated and the plate exposed as described, the plate is developed to produce the opaque and transparent areas already described. So long as the plate after processing, is dimensionally stable and is reinserted in proper register and the apparatus is otherwise mechanically stable, accuracy is assured without any need for precise manual pattern layouts and so on. More important, the self-generated analog to digital correspondence automatically corrects for non-linearities in the system.

The specific transparent area-opaque area cell make-up shown in FIG. 3 assumes a conversion in the optical fibers from the linear array of FIG. 2a to the zig-zag array shown in FIG. 2b. If the array in FIG. 2b is different than the one shown as, for example, spiral or even random, then the opaque-transparent coding is different than that shown in FIG. 3.

The system of FIG. 1 employs an optical tunnel for converting a single source or spot of light into a multiplicity of light spots, one for each image. Here and in the other embodiments to be discussed, other means may be used for doing the same thing. For example, an array of side-by-side lenses as described in Patent No. 2,794,997 may be used.

Another system according to the present invention is shown in FIG. 4. It is for determining in digital form the coordinates of a graph. The graph is shown at 40 and it appears as a transparent or translucent trace on an opaque chart 42. The chart is driven along the $x$ coordinate by a drive mechanism 44 such as a motor. The chart 42 is illuminated by a source (not visible) behind the chart. The linear end 22 of the bundle of fiber optics, shown in greater detail in FIG. 1, is shown over the chart.

The drive mechanism 44 also drives a disk 46 formed with regularly spaced holes (not visible in the drawing) about its peripheral edge. Light from a source 48 passes through one of the holes and actuates a photocell 50. The pulse output of the photocell may be amplified by amplifier 52 and applied to the reset terminals of bistable circuits 36, some of which are shown. The pulses may also be applied to a counter 53.

The remainder of the arrangement of FIG. 4 is similar to the one of FIG. 1 and is not illustrated. Thus, the fiber optics extend from the linear end 22 to a square end 24 as shown in FIG. 1. The light appearing at the square end is projected by optical tunnel 26 and a lens 28 or an analogous arrangement onto each cell in the matrix 30. The output of each cell is applied to a photocell 34, some of which are shown in FIG. 4, and the output of each photocell is applied to the set terminal of a bistable circuit 36 associated with that photocell as is also shown in FIG. 4. The output of the flip-flops represents a binary number in parallel form.

The circuit of FIG. 4 operates as follows. The chart may be initially positioned so that the line of fiber optics is parallel to the $y$ axis and intersects the $x=0$ point. The counter may be reset to register zero at this time. The drive mechanism then moves the chart at the left. The entire chart is opaque except for the area of curve 40. Light passes through the curve portion adjacent to the line of fiber optics and is projected by the optical tunnel onto each cell in the optical matrix in the manner already indicated. The drive mechanism also rotates the disk 46 with holes in its peripheral edge. Light passes through a hole in one of the photocells and the electrical pulse which results is amplified and applied to a counter 53 and a timing circuit 55. The condition set or reset of the bistable circuits represents a parallel binary number indicative of the value of the $y$ coordinate of the curve for each separate $x$ position of the chart. The count is, therefore, an indication of the $x$ coordinate of the graph at which the parallel binary number above is obtained. The timing circuit 55 generates timing pulses which are applied in conventional fashion to gate the binary numbers available at bistable circuits 36 between various stages in a digital computer (not shown). The timing circuit 55 also generates a reset signal R for the bistable circuits 36 for each of the $x$ positions of the chart. This process is continued until the $x$ and $y$ coordinates of each portion of the curve are obtained. The more closely the holes in the disk 46 are spaced, the closer the points on the curve represented in binary number form.

Figure 5:
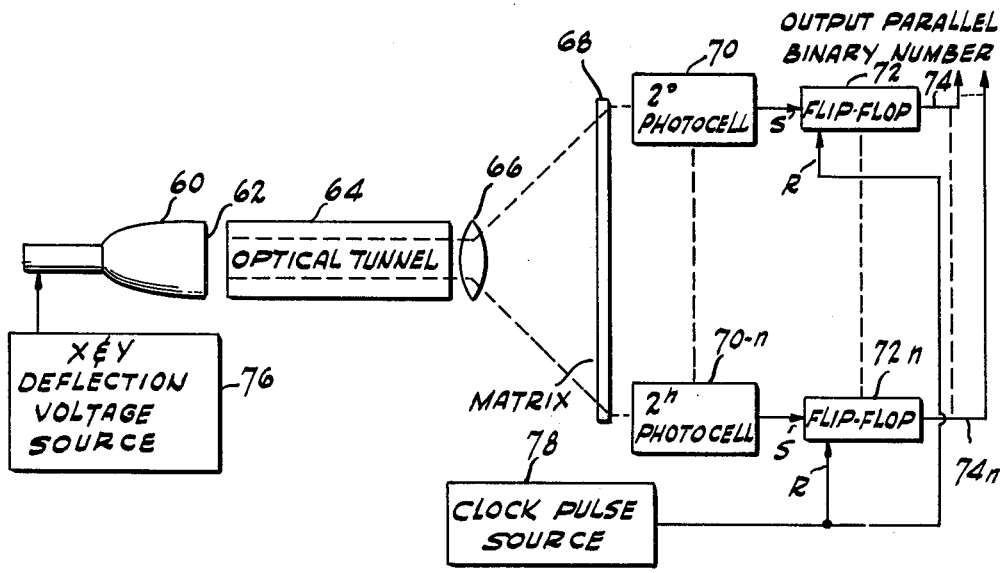
FIG. 5 is a block and schematic diagram of a third form of the present invention.

FIG. 5 shows a system for reading the position of a spot of light on the screen of an oscilloscope 60. In this application, the fiber optics may be omitted. The oscilloscope screen 62 is positioned adjacent to the input end of the optical tunnel 64. The optical tunnel and lens 66 project the position of the spot on the screen 62 onto each of the cells in the matrix 68. As in the previous systems, there is one photocell for each cell in the matrix which is used. The $2^0$ photocell 70 and the $2^n$ photocell 70–$n$ are as shown. The photocell outputs are applied to the set terminals of flip-flops 72 through 72–$n$, two of which are shown in the figure. An "$n$" position parallel binary number representing the position of a spot of light appears at the outputs 74 through 74–$n$. The source of $x$ and $y$ deflection voltages is as shown at 76. A clock pulse source for resetting the flip-flops 72 through 72–n is shown at 78. This source may also be connected to a register or other output device to which the leads 74 through 74–n may be connected so that the output information may be shifted along the register each time the flip-flop is cleared (reset).

In the system of FIG. 5, synchronization is not required between the clock pulse source 78 and the deflection voltage source 76. The cathode ray tube may be thought of as merely a special type of analog display for a single function of time $f(t)$. The constant frequency clock pulse source can be considered the means for uniformly sampling the analog quantity and its clock pulses may, for example, be applied to a counter.

Very high precisions may be achieved with the system of FIG. 5 by causing the trace to sweep through a relatively large distance. For example, a given $f(t)$ may be displayed in the form of a long spiral rather than a straight line, thereby substantially increasing the effective resolution of which the tube is capable. The deflection voltages $e$ in this case are $e(x)=Kv(t)\sin v(t)$ and $e(y)=Kv(t)\cos v(t)$, where $K$ is a constant, and $v(t)$ is the parameter being measured.

What is claimed is:

1. An arrangement for transforming the position of an indication along a line into a digital quantity in parallel binary form comprising, in combination, a fixed optical matrix including a plurality of cells each representing a different power of two and each including substantially opaque and substantially transparent areas; and means responsive to the position of said indication for simultaneously projecting light onto the same restricted portion of each cell to produce optical outputs from the cells manifesting a binary number indicative of the analog quantity, said means including a fiber optics transducer which, at one end, comprises a line of fibers positioned parallel to the line along which said indication occurs, and at the other end is in the form of a two dimensional array of fibers.

2. An arrangement for transforming the position of an indication along a line into a digital quantity in parallel binary form comprising, in combination, a fixed optical matrix including a plurality of cells, each representing a different power of two, and each including substantially opaque and substantially transparent areas; and means responsive to the position of said indication for simultaneously projecting light onto the same restricted portion of each cell to produce optical outputs from the cells manifesting a binary number indicative of the analog quantity, said means including a fiber optics transducer which, at one end, comprises a line of fibers positioned parallel to the line along which said indication occurs, and at the other end is in the form of a two dimensional array of fibers, and an optical tunnel arranged to receive the light output of said other end of said fiber optics transducer.

3. An arrangement for transforming the position of an indication along a line into a digital quantity comprising, in combination, a matrix including a plurality of cells with transparent and opaque areas representing the binary digits "one" and "zero," each cell coded to represent a different power of two; means responsive to the position of said indication for projecting a discrete spot of light onto the same relative location of each cell of said matrix, said means comprising optical means for resolving one spot of light into an array of discrete light spots, including one for each cell, and means for translating the position along said line of said indication into the position in a two dimensional plane of said one spot of light resolved by said optical means; and means coupled to the cells of said matrix for sensing which of the cells pass said spot of light and for deriving therefrom a manifestation in binary form of the magnitude of said analog quantity.

4. An arrangement for translating the position of an indication into a binary number comprising, means for translating said indication into a spot of light; means for resolving said spot of light into an array of light spots; a matrix of cells arranged in columns and rows, each cell coded in transparent and opaque areas to represent a different power of two; and means for projecting the array of light spots onto the matrix so that each cell receives one spot and each spot is in the same relative position in each cell.

5. An arrangement for translating the position of an indication into a binary number comprising, means including a fiber optics transducer arranged in a line at its input end and having a rectangular array of fibers at its output end for translating said indication into a spot of light; means for resolving said spot of light into an array of light spots; a matrix made up of cells, each coded in transparent and opaque areas to represent a different power of two; and means for projecting the array of light spots into the matrix so that each cell receives one spot and each spot is in the same relative position in each cell.

6. An arrangement for translating the position of an indication into a binary number comprising, means including a fiber optics transducer arranged in a line at its input end and having a rectangular array of fibers at its output end for translating said indication into a spot of light; means including an optical tunnel for resolving said spot of light into an array of light spots; a matrix made up of cells, each coded in transparent and opaque areas to represent a different power of two; and means for projecting the array of light spots onto the matrix so that each cell receives one spot and each spot is in the same relative position in each cell.

7. In a chart reader, means for moving a chart in a direction parallel to one of the chart coordinates; means for illuminating the chart; a fiber optics transducer formed as a line of fibers at its input end and having a different configuration at its output end, said line of fibers being arranged perpendicular to the direction of chart movement and adjacent to the chart; and means responsive to a single spot of light emitted from the output end of said transducer for producing a multiple digit binary number indicative of a parameter represented by the chart.

8. An arrangement for transforming the position of an indication along a line into a digital quantity comprising, in combination, a matrix including a plurality of cells with transparent and opaque areas representing the binary digits "one" and "zero," each cell coded to represent a different power of two; means responsive to the position of said indication for projecting a spot of light onto the same portion of each cell of said matrix, said means comprising optical means for resolving one spot of light into a plurality of light spots, including one for each cell, and a fiber optics transducer arranged in a line at one end and in a two-dimensional array at its other end for translating the position of said indication into the one spot of light resolved by said optical means; and means coupled to the cells of said matrix for sensing which of the cells pass said spot of light and for deriving therefrom a manifestation in binary form of the magnitude of said analog quantity.

References Cited by the Examiner

UNITED STATES PATENTS

| | | | |
|---|---|---|---|
| 2,714,204 | 7/55 | Lippel et al. | 340—347 |
| 2,755,020 | 7/56 | Belcher | 340—347 |
| 2,855,539 | 10/58 | Hoover | 340—3 |
| 2,888,672 | 5/59 | Young | 340—324 |

MALCOLM A. MORRISON, *Primary Examiner.*

IRVING L. SRAGOW, DARYL W. COOK, *Examiners.*